United States Patent
Itani et al.

(10) Patent No.: US 6,895,172 B2
(45) Date of Patent: May 17, 2005

(54) VIDEO SIGNAL REPRODUCING APPARATUS

(75) Inventors: Tetsuya Itani, Ikoma (JP); Satoshi Kondo, Yawata (JP)

(73) Assignee: Matsushita Electric Industries Co., Ltd. (JP)

(*) Notice: Subject to any disclaimer, the term of this patent is extended or adjusted under 35 U.S.C. 154(b) by 850 days.

(21) Appl. No.: 09/775,272

(22) Filed: Feb. 7, 2001

(65) Prior Publication Data

US 2001/0016107 A1 Aug. 23, 2001

(30) Foreign Application Priority Data

Feb. 15, 2000 (JP) .................................... 2000-036141

(51) Int. Cl.[7] ........................... H04N 5/781; H04N 7/01
(52) U.S. Cl. ..................... 386/95; 386/125; 386/131; 348/446; 348/448
(58) Field of Search .................... 386/1, 45, 95, 386/125–126, 131; 348/441, 446, 448; H04N 5/75, 5/781, 7/01

(56) References Cited

U.S. PATENT DOCUMENTS

| | | | |
|---|---|---|---|
| 5,294,983 A | 3/1994 | Ersoz et al. | ............... 348/521 |
| 6,144,412 A | * 11/2000 | Hirano et al. | ............... 348/441 |
| 6,512,881 B1 | * 1/2003 | Kinebuchi et al. | ............ 386/68 |
| 2003/0108341 A1 | * 6/2003 | Oshima et al. | ............. 386/125 |

FOREIGN PATENT DOCUMENTS

| | | |
|---|---|---|
| EP | 0 350 234 | 1/1990 |
| EP | 0 584 693 | 3/1994 |
| EP | 0 710 016 | 5/1996 |
| EP | 0 935 385 | 8/1999 |

OTHER PUBLICATIONS

Willner et al., "Transforming the PC into a TV, Radio, VCR, and Video Editing Studio," Wescon Technical Papers, Western Periodicals Co., North Hollywood, U.S., Nov. 7, 1995, pp. 743–748, XP000586646.

* cited by examiner

Primary Examiner—Thai Tran
(74) Attorney, Agent, or Firm—Parkhurst & Wendel, L.L.P.

(57) ABSTRACT

In a video signal reproducing apparatus, the changing time of a sub-video signal is adjusted, by a time-adjusting circuit, so as to be synchronized with the changing of a frame of a main video signal from the output of an interlace-scan-video-signal converter. And the sub-signal is added to the output of an interlace-scan converter by an adder. The output of the adder is converted into a progressive-scan video signal in synchronism with the boundary of frames of main video signal by the progressive-scan video signal converter. In the reproducing apparatus, even in the case that the sub-video signal is recorded without synchronism with the frames of the main video signal, an irregular frame is not generated even when the sub-video changes. And a single field of the sub-video does not leave or is not visible.

5 Claims, 10 Drawing Sheets

FIG. 10
PRIOR ART
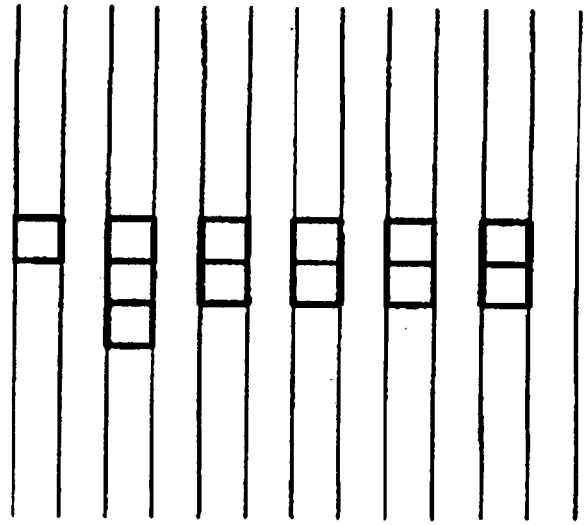
(b) Sub Video Image on Irregular Frame
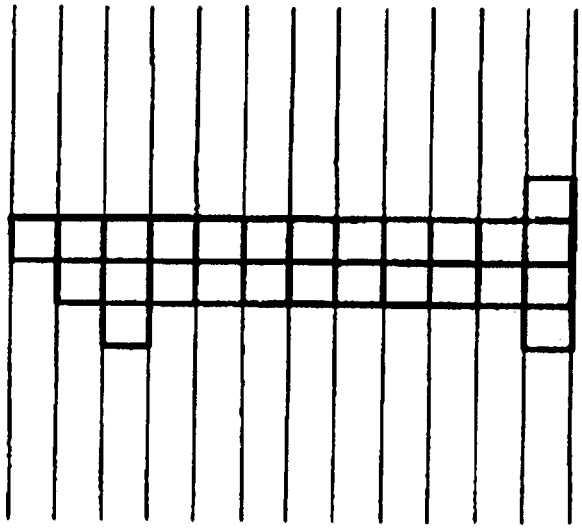
(a) Sub Video Image on Regular Frame

VIDEO SIGNAL REPRODUCING APPARATUS

FIELD OF THE INVENTION

The present invention relates to a video signal reproducing apparatus for progressively scanning and reproducing video signals by transferring video data such as a movie and a video clip in a digital versatile disk (DVD) or a satellite broadcast.

BACKGROUND OF THE INVENTION

A video output of the DVD or the satellite broadcast is generally issued in interlace-scanning so as to be reproduced with a television receiver. Recently, however, as monitors and projectors applicable to multi-scanning and monitors for computers are widely used, a video signal reproducing apparatus for converting the interlace-scan video signal into a progressive-scan video signal has been introduced.

FIG. 6 is a block diagram showing a configuration of a conventional video signal reproducing apparatus. A disk 1 records a electric main video signal converted from a movie and sub-video information including subtitle information. These pieces of information are preliminarily coded and modulated into signal formats suited to the recording. A pick-up 2 converts the signal recorded in the disk 1 into an electric signal. A disk-rotating device 3 rotates the disk 1 at a rotating speed suited to the reproducing. A main video signal reproducing circuit 4 demodulates the main video signal recorded in the disk 1. A time-signal generator 5 generates time-signals used: 1) when an interlace-scan-video-signal converter 6 converts the output of the main video signal reproducing circuit 4 into interlace-scan video signal; and 2) when a progressive-scan video-signal converter 12 converts the output of an adder 8 into a progressive-scan video signal. The interlace-scan video-signal converter 6 converts the output of the main video signal reproducing circuit 4 into an interlace-scan video signal based on the output of the time-signal generator 5. A sub-video signal reproducing circuit 7 demodulates the sub-video signal recorded in the disk 1. The adder 8 sums the outputs of the interlace-scan-video-signal converter 6 and the sub-video signal reproducing circuit 7. An NTSC encoder 9 converts the interlace-scan video signal into NTSC video format and issues it through an interlace-scan-video-signal output terminal 10. The progressive-scan-video-signal converter 12 converts the output of the adder 8 into a progressive-scan video signal based on the output of the time-signal generator 5 and outputs it. A chrominance converter 13 converts the output of the progressive-scan-video-signal converter 12 into a progressive-scan chrominance signal and issues it through a progressive-scan-video-signal output terminal 14.

The operation of the conventional video signal reproducing apparatus having such configuration will be explained below.

FIG. 7 is a schematic diagram showing compositions of the interlace-scan video signal and the progressive-scan video signal in the conventional video signal reproducing apparatus. In the interlace-scan video signal, one video field is composed per 1/60 second, and two video fields form one video frame. The number of longitudinal pixels of each video field is 240. The pixels of the video fields fill up the gaps in the pixels in the longitudinal direction to each other. In the progressive-scan signal, one frame is composed per 1/60 second, and the number of longitudinal pixels is 480. The vertical scan periods of both signals are both 1/60 second. The number of horizontal scan lines of the progressive-scan video signal is twice as many as that of the interlace-scan video signal. And hence, the horizontal scan frequency of the interlace-scan video signal is about 15.75 kHz, while that of the progressive-scan video signal is about 31.5 kHz.

FIG. 8 is a time-chart showing the operation of the conventional video signal reproducing apparatus. The disk 1 records a video signal generated from movies. As shown in FIG. 8(a), signals captured at 24 frames per second are recorded in the sequence of frames numbered by . . . , n, n+1, n+2, n+3, n+4, . . . . The recorded movie video signal is converted into an electric signal by the pickup 2, demodulated in the main video signal reproducing circuit 4, and converted and issued as an interlace-scan video by the interlace-scan-video-signal converter 5. That is because the television monitor, which is most widely used as the video display device in the household, employs an interlace-scan display system. Since the television monitor is designed for displaying a moving picture of 30 frames/60 fields per second, the interlace-scan-video-signal converter 6 converts a video signal of 24 frames per second into the interlace-scan video signal of 30 frames/60 fields per second and issues it. That is, the interlace-scan-video signal reproducing circuit 4 divides the frames, as shown in FIG. 8(b), into odd and even interlace-scan field images. Further, the reproducing circuit 4 outputs the first field repeatedly after the second field when the output signal of the time-signal generator 5, shown as a repeat first field (RFF) in FIG. 8(d), is at a high level.

The disk 1 also records the sub-video signal such as subtitle information aside from the main video signal. The sub-video signal is demodulated as an interlace-scan video signal by the sub-video signal reproducing circuit 7 and issued as shown in FIG. 8(c). The sub-video changes in a longer interval than the main video changes and is not synchronized with the change of the main video. The adder 8 in FIG. 6 adds the sub-video reproduced by the sub-video signal reproducing circuit 7 to the output of the interlace-scan-video-signal converter 6 and outputs it. The output is shown in FIG. 8(i). Sub-videos S1, S2, and S3 are added to the n, n+1, n+2, n+3, and n+4 fields (odd, even). The interlace-scan-video signal to which the sub-video is added is converted into an NTSC standard video signal by the NTSC encoder 9 and issued to the interlace-scan-video-signal output terminal 10. The terminal 10 is coupled to a television monitor (not shown). An user can watch the movie video converted into interlace-scan video with the monitor.

The adder 8 in FIG. 6 feeds the interlace-scan video signal into the progressive-scan-video-signal converter 12. For generating a progressive-scan video signal shown in FIG. 8(j), the converter 12 combines, in every line, the progressive-scan video signal in FIG. 8(i) issued by the adder in two fields succeeding the change point of the time-signal shown as the RFF in FIG. 8(d).

FIG. 9 is a schematic diagram showing the operation of the progressive-scan-video-signal converter of the conventional video signal reproducing apparatus.

The progressive-scan video signal converter 12 couples each line of the first and second fields alternately in each frame of the interlace-scan video signal. Further, the converter 12 reads it out at double speed and generates the progressive-scan video signal shown in FIG. 8(j). The converted video signal is further converted into an analog progressive-scan chrominance signal by the chrominance converter 13 in FIG. 6 and issued from the progressive-scan-video-signal-output terminal 14. The terminal 14 is coupled to a television monitor (not shown) for progressive-scan-video signal. A user can then enjoy the movie video converted back to the progressive-scan video.

In the progressive-scan video signal shown in FIG. 8(j), an irregular frame may be generated partially as shown in FIG. 8(k). This is the progressive-scan video signal generated by combining interlace-scan video signals on fields having different sub-video signals from each other. The signal contains different sub-video per each line.

FIG. 10 is a schematic diagram of images of the video signal of the conventional video signal reproducing apparatus, in which FIG. 10(a) shows the image of the video signal of the regular frame, and FIG. 10(b) shows the image of the video signal of the irregular frame.

For example in FIG. 8, the numeral "1" is displayed in a certain area of the sub-video S1, while no character is displayed in the same area of the sub-video S2. The first three frames of the progressive-scan video information in FIG. 8(j) are regular frames, and a main video n and sub-video S1 are normally displayed, and therefore, the numeral "1" is correctly displayed as shown in regular frame in FIG. 10(a). In the next frame, however, the main video is n+1, the sub-video included in the beginning field is S1, and the sub-video included in the second frame is S2. And therefore, the sub-video S1 and sub-video S2 are combined and displayed alternatively per every line. This is the irregular frame, where numeral "1" is thus displayed in every other line as shown in FIG. 10(b).

As described herein, in the conventional video signal reproducing apparatus, the sub-video signal is recorded without being synchronized with the main video signal of the frame. That is not a problem for the interlace-scan signal, but for the progressive-scan video signal, the irregular frame is generated when the sub-video changes, and thus, a single field of the sub-video is visible.

SUMMARY OF THE INVENTION

A video signal reproducing apparatus for issuing progressive-scan video signal not leaving a sub-video in a single field to be visible even when the sub-video changes.

The video signal reproducing apparatus comprises:

(a) an interlace-scan converter converting a main video signal into an interlace-scan video signal, (b) a sub-video signal adder adding a sub-video signal to the output of the interlace-scan converter in synchronism with the boundary of frames of the main video signal in the output of the interlace-scan video converter, and (c) a progressive-scan converter converting the output of the sub-video adder into a progressive-scan video signal in synchronism with the boundary of frames of the main video signal.

BRIEF DESCRIPTION OF THE DRAWINGS

FIG. 10(a) is a schematic diagram of a video signal in a regular frame of the conventional video signal reproducing apparatus.

FIG. 10(b) is a schematic diagram of a video signal in an irregular frame of the conventional video signal reproducing apparatus.

DETAILED DESCRIPTION OF THE PREFERRED EMBODIMENTS (Embodiment 1)

Figure 1:
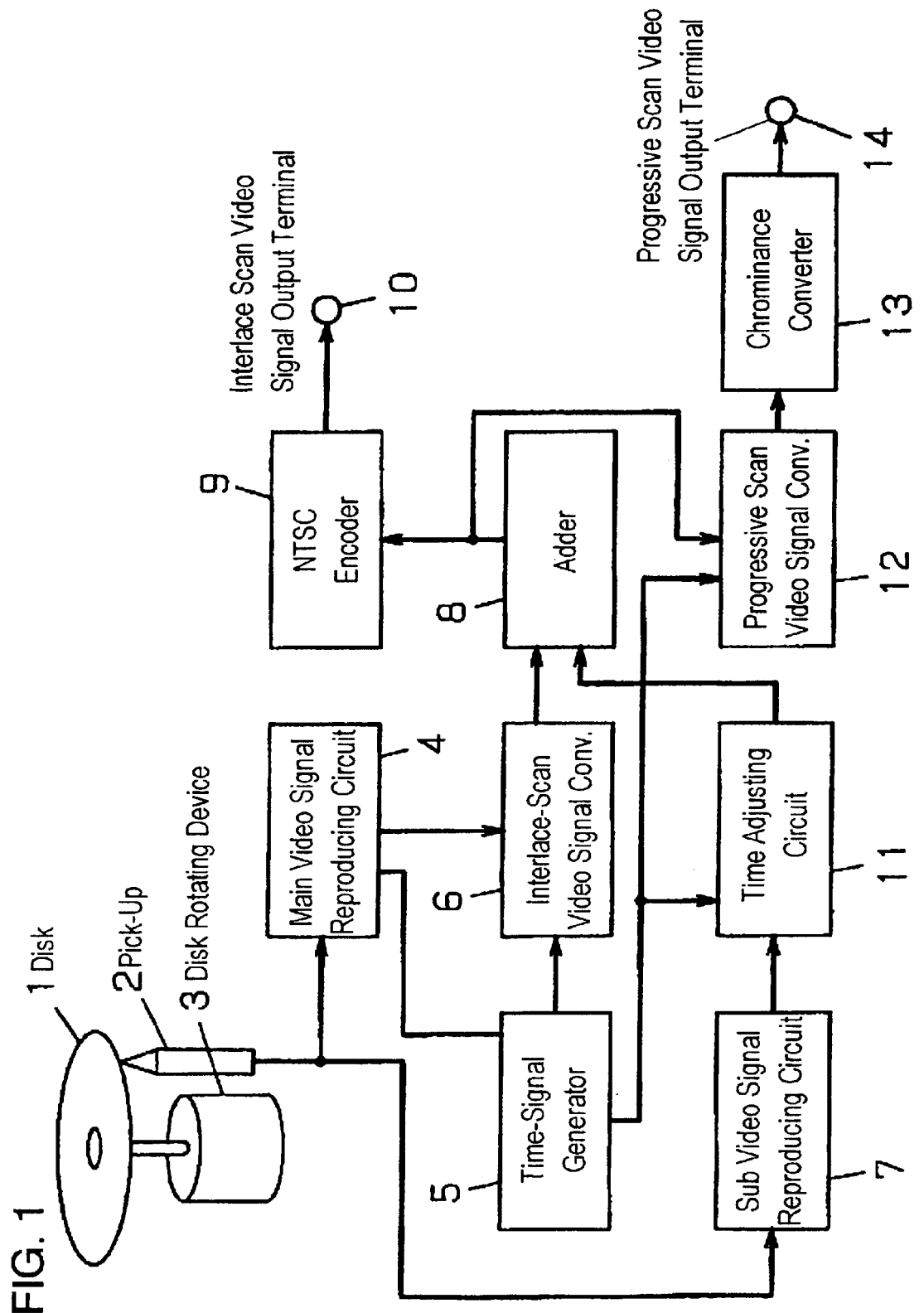
FIG. 1 is a block diagram showing a configuration of a video signal reproducing apparatus according to embodiment 1 of the present invention.

FIG. 1 is a block diagram showing a configuration of a video signal reproducing apparatus according to embodiment 1 of the present invention. A disk 1 records a electric video signal converted from a movie video and a sub-video information including subtitle information. These pieces of information are preliminarily coded and modulated into signal format suited to the recording. A pick-up 2 converts the signal recorded in the disk 1 into an electric signal. A disk rotating device 3 rotates the disk 1 at a rotating speed suited to the reproducing. A main video signal reproducing circuit 4 demodulates the video signal recorded in the disk 1. A time-signal generator 5 generates time-signals used: 1) when an interlace-scan-video-signal converter 6 converts the output of the main video signal reproducing circuit 4 into interlace-scan video signal; and 2) when a progressive-scan-video-signal converter 12 converts the output of an adder 8 into progressive-scan video signal. The interlace-scan-video-signal converter 6 converts the output of the reproducing circuit 4 into an interlace-scan video signal based on the output of the time-signal generator 5.

A sub-video signal reproducing circuit 7 demodulates the sub-video signal recorded in the disk 1. A time-adjusting circuit 11 delays the output of the reproducing circuit 7 based on the output of the time-signal generator 5. The adder 8 sums the outputs of the interlace-scan-video-signal converter 6 and the time-adjusting circuit 11. An NTSC encoder 9 converts the interlace-scan video signal into NTSC video format and issues it through an interlace-scan-video-signal output terminal 10. The progressive-scan-video-signal converter 12 converts the output of the adder 8 into a progressive-scan video signal based on the output of the time-signal generator 5 and issues it. A chrominance converter 13 converts the output of the converter 12 into a progressive-scan chrominance signal and issues it through a progressive-scan-video-signal output terminal 14.

The operation of the video signal reproducing apparatus according to embodiment 1 of the present invention having such configuration will be explained below.

Figure 2:
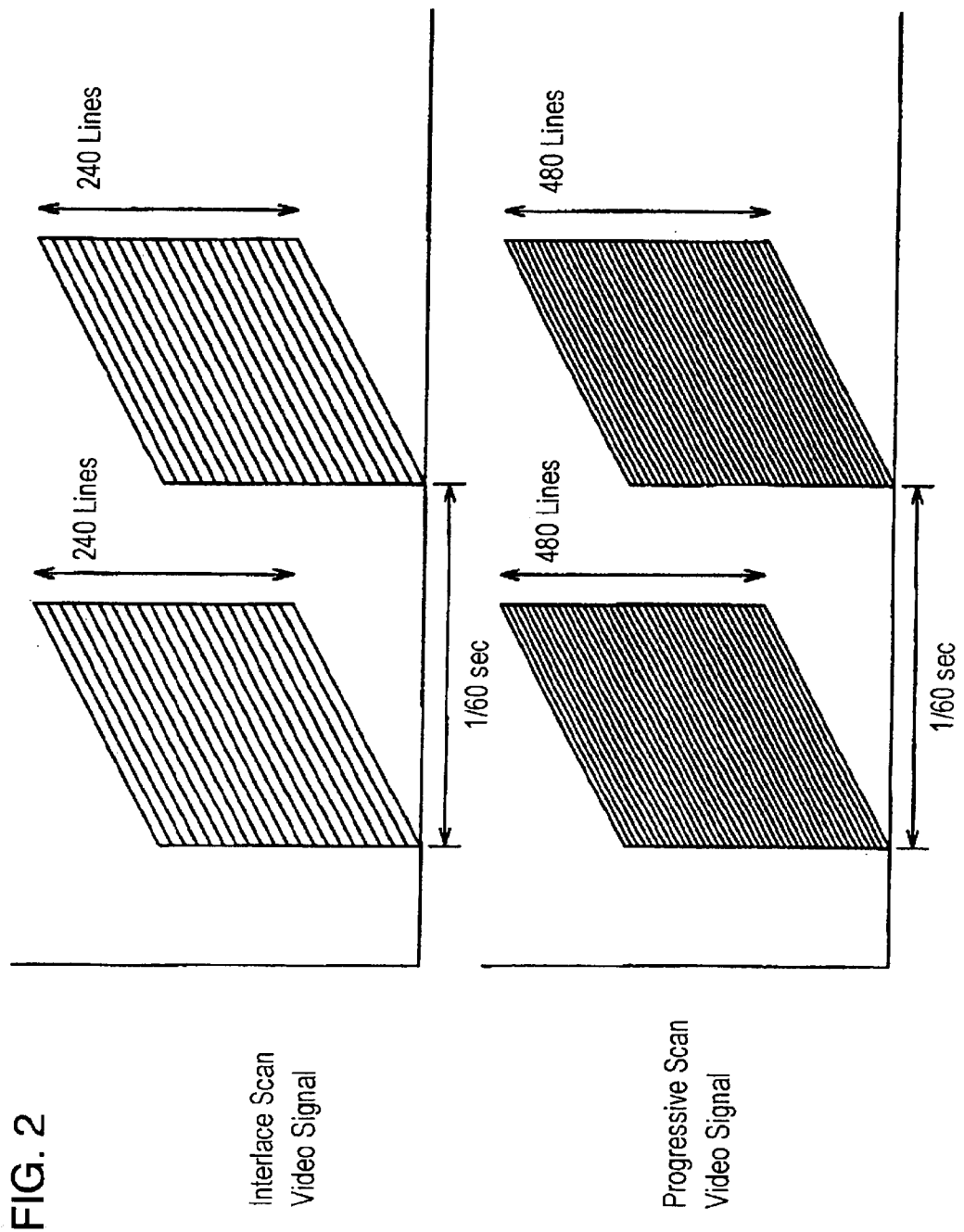
FIG. 2 is a schematic diagram showing compositions of an interlace-scan video signal and progressive-scan video signal.

FIG. 2 is a schematic diagram showing compositions of the interlace-scan video signal and the progressive-scan video signal in the video signal reproducing apparatus according to embodiment 1 of the invention. In the interlace-scan video signal, one video field is composed per 1/60 second, and two video fields form one video frame. The number of longitudinal pixels of each video field is 240. The pixels of the video fields fill up the gaps in the pixels in the longitudinal direction to each other. In the progressive-scan signal, one frame is composed per 1/60 second, and the number of longitudinal pixels is 480. The vertical periods of the both signal are 1/60 second. The number of horizontal scanning lines of the progressive-scan video signal is twice as many as that of the interlace-scan video signal. And hence, the horizontal scanning frequency of the interlace-scan video signal is about 15.75 kHz, while that of the progressive-scan video signal is about 31.5 kHz.

Figure 3:
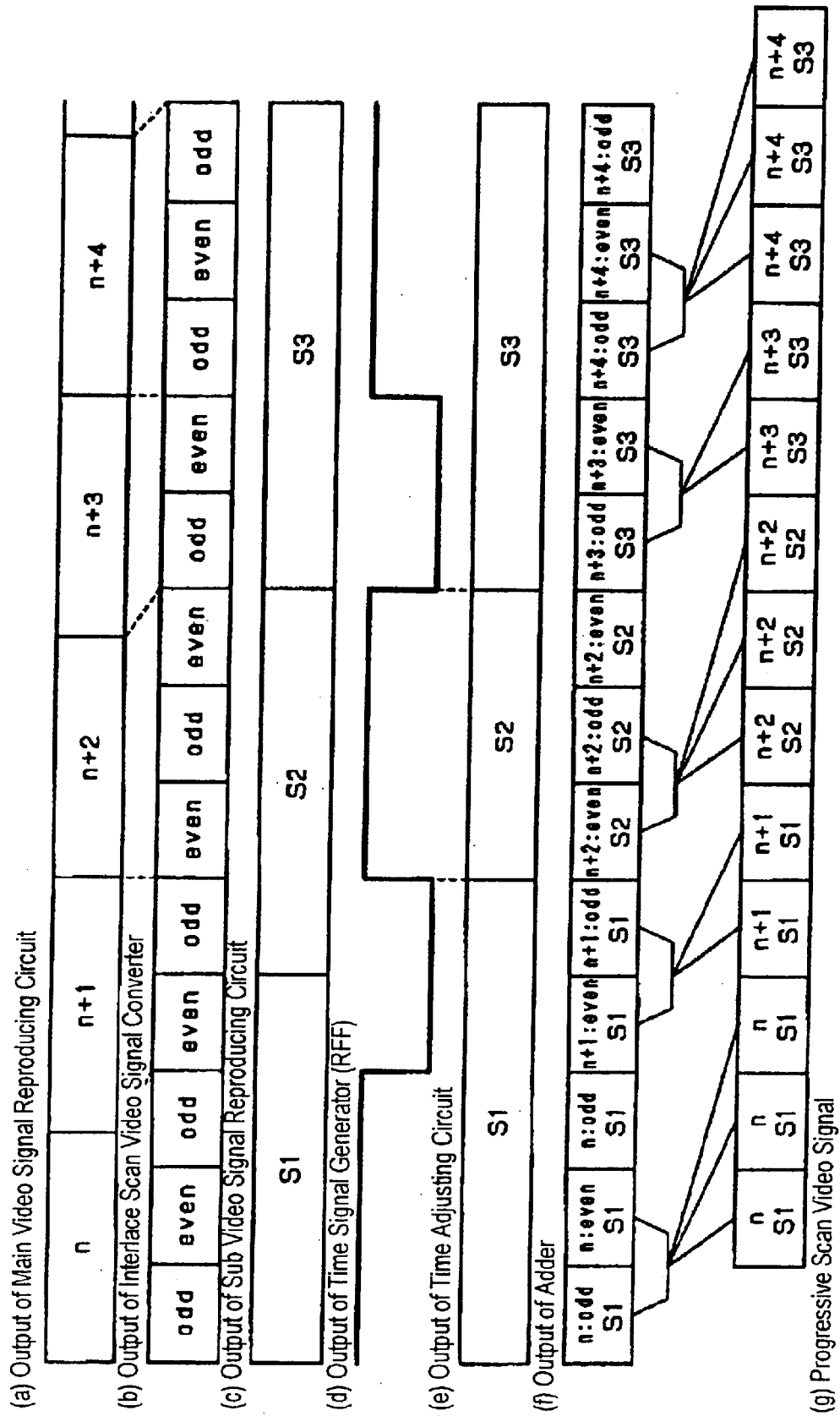
FIG. 3 is a time chart showing the operation of the video signal reproducing apparatus according to embodiment 1.

FIG. 3 is a time-chart showing the operation of the video signal reproducing apparatus according to embodiment 1 of the invention. The disk 1 records a video signal generated from movies. As shown in the output of the main video signal reproducing circuit in FIG. 3(a), signals captured at 24 frames per second are recorded in the sequence of frames numbered by ..., n, n+1, n+2, n+3, n+4, .... The recorded movie signal is converted into an electric signal by the pickup 2, demodulated by the main video signal reproducing circuit 4, and converted and issued as an interlace-scan video signal by the interlace-scan-video-signal converter 5. That is because the television monitor, which is most widely used as the video display device in the household, employs an interlace-scan display system. Since the television monitor is designed for displaying a moving picture of 30 frames/60 fields per second, the interlace-scan-video-signal converter 6 converts a video signal of 24 frames per second into an interlace-scan video signal of 30 frames/60 fields per second. That is, the interlace-scan-video-signal reproducing circuit 4 divides the frames, as shown in FIG. 3(b), into odd and even interlace-scan field videos. Further, the reproducing circuit 4 outputs the first field repeatedly after the second field when the output signal of the time-signal generator 5, shown as a repeat first field (RFF) in FIG. 3(d), is at a high level.

The disk 1 also records, aside from the main video, a sub-video signal such as subtitle information. The sub-video signal is demodulated as an interlace-scan video signal by the sub-video signal reproducing circuit 7 and issued as shown in FIG. 3(c). The sub-video changes in a longer interval than the main video changes and is not synchronized with the changing of the main video signal. The output of the sub-video signal reproducing circuit 7 is latched by the time-adjusting circuit 11 when the output of the time-signal generator 5 changes, and the sub-video signal is sent to the adder 8. The output is shown in FIG. 3(e). In the output of the sub-video signal reproducing circuit shown in FIG. 3(c), the sub-video does not change from the video S1 to the video S2 in synchronism with the changing of the output of the main video signal reproducing circuit shown in FIG. 3(a). However, in the output of the time-adjusting circuit in FIG. 3(e), the sub-video changes over from the video S1 to the video S2 in synchronism with the changing of the main video from the video n+1 to the video n+2 of the output of the main video signal reproducing circuit in shown FIG. 3(a). The adder 8 in FIG. 1 adds, to the output of the interlace-scan-video-signal converter 6, the subtitle information reproduced in the sub-video signal reproducing circuit 7 synchronized with the changing of the main video by the time-adjusting circuit 11. The output of the adder is shown in FIG. 3(f). The sub-video S1, S2, and S3 are added to the n, n+1,n+2, n+3, and n+4 fields (odd, even). The interlace-scan video signal to which the subtitle information is added is converted into an NTSC standard video signal by the NTSC encoder 9 and issued through the interlace-scan-video-signal output terminal 10. The terminal 10 is coupled to a television monitor (not shown). A user can enjoy the movie video converted into an interlace-scan video with the monitor.

The adder 8 in FIG. 1 feeds the interlace-scan video signal into the progressive-scan-video-signal converter 12. For generating the progressive-scan video signal shown in FIG. 3(g), the converter 12 combines, in every line, the progressive-scan video signal in FIG. 3(f) issued by the adder in two fields succeeding the change point of the time-signal shown as the RFF in FIG. 3(d).

Figure 4:
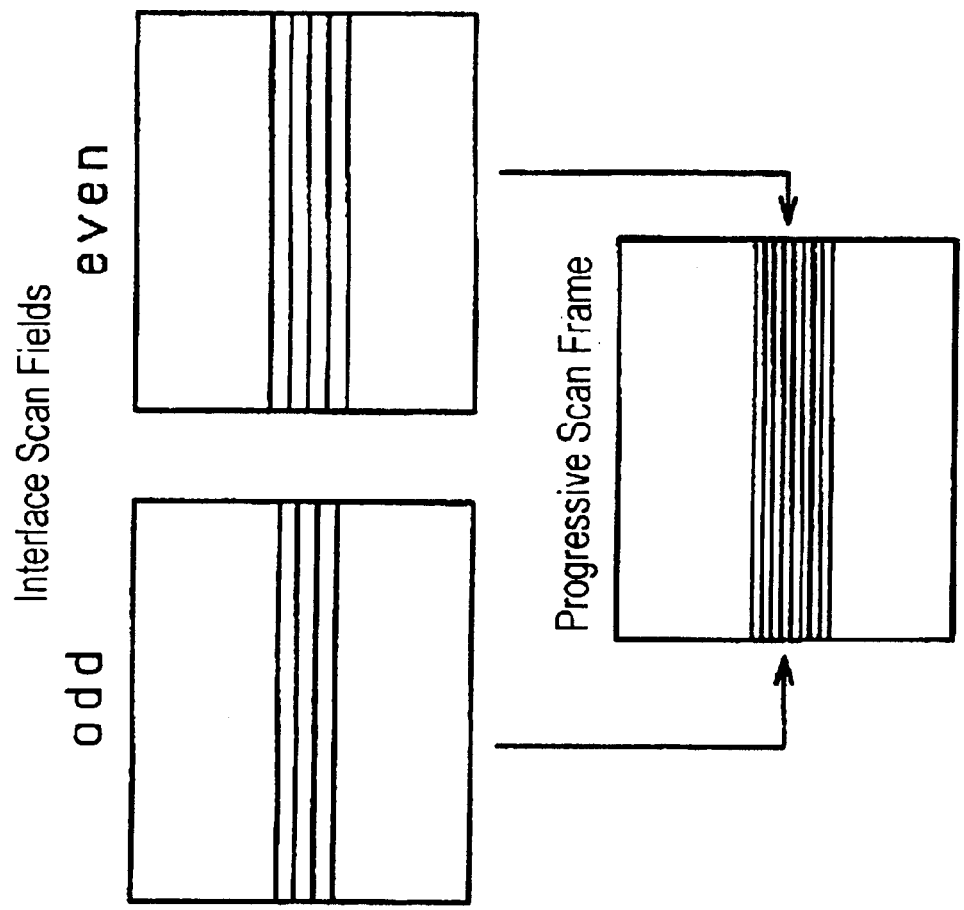
FIG. 4 is a schematic diagram showing the operation of progressive-scan video signal converter in the video signal reproducing apparatus according to embodiment 1.

FIG. 4 is a schematic diagram showing the operation of the progressive-scan-video-signal converter of the video signal reproducing apparatus according to embodiment 1 of the invention.

As shown in the diagram, the progressive-scan-video-signal converter 12 couples each line of the first and second fields alternatively in each frame of the interlace-scan-video signal shown in FIG. 3(f). Further, the converter 12 reads it out at a double speed and generates the progressive-scan video signal shown in FIG. 3(g). The converted video signal is further converted into an analog progressive-scan chrominance signal by a chrominance converter 13 in FIG. 1 and issued through a progressive-scan-video-signal output terminal 14. The terminal 14 is coupled to a television monitor (not shown) for progressive-scan video signal. And a user can then enjoy the movie video converted back to the progressive-scan signal.

Figure 5:
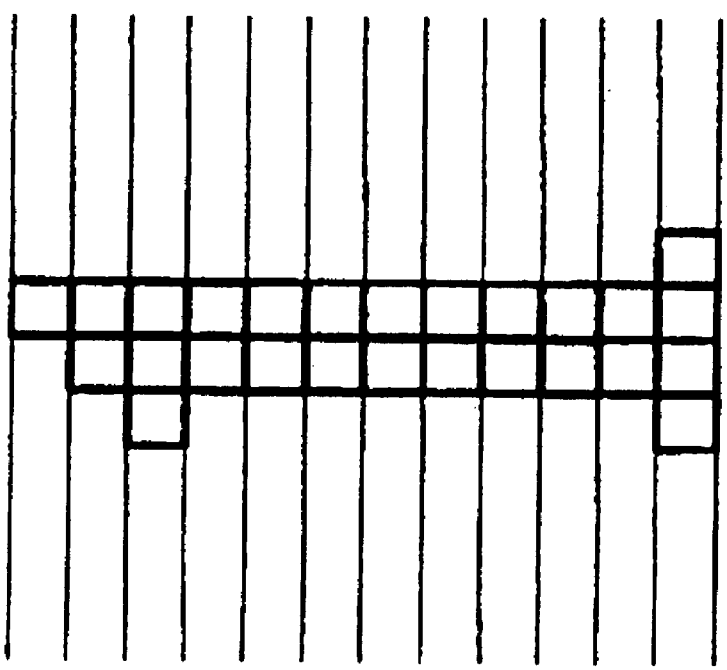
FIG. 5 is a schematic diagram of an example of a video signal of the video signal reproducing apparatus according to embodiment 1.
Figure 6:
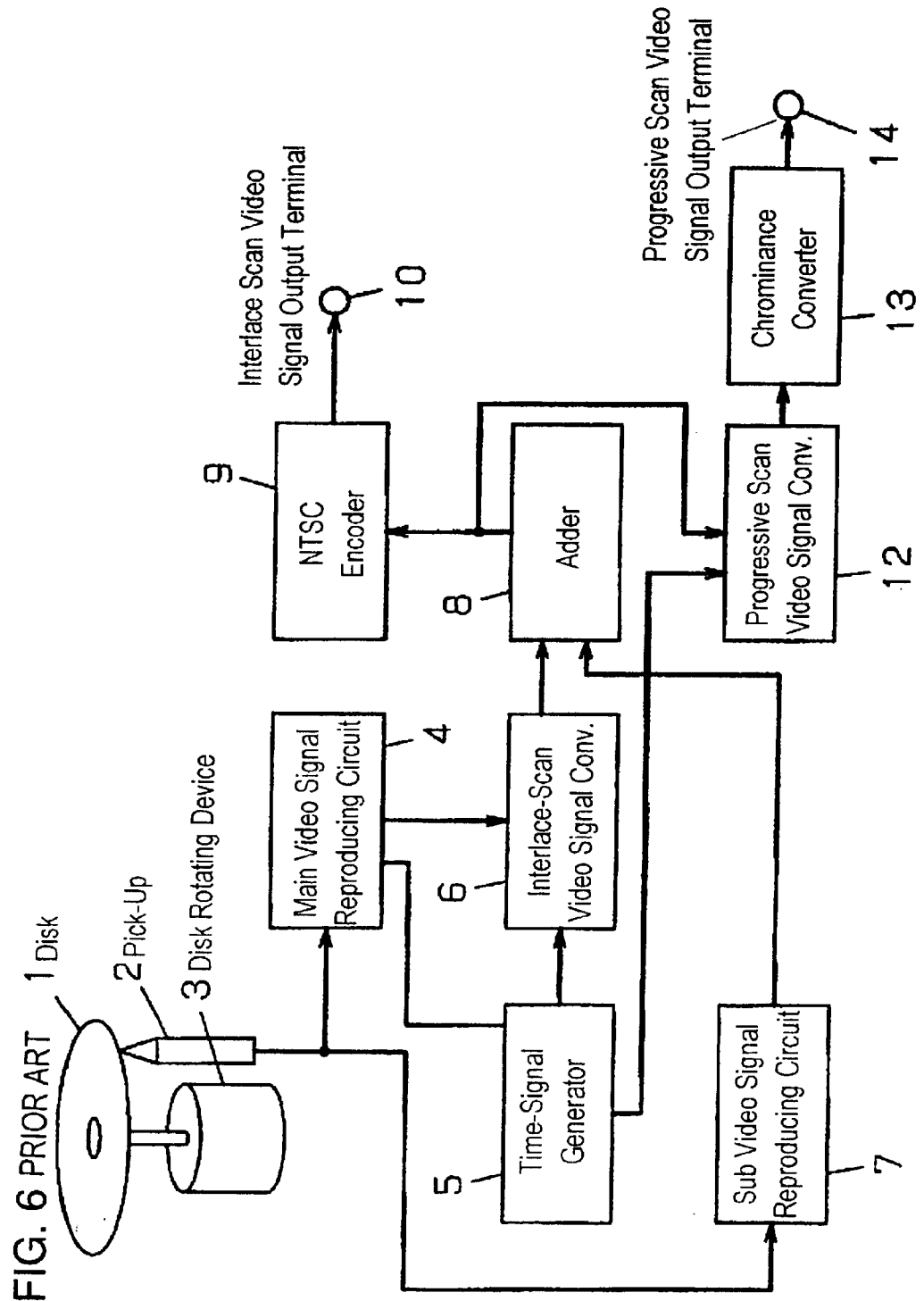
FIG. 6 is a block diagram showing a configuration of a conventional video signal reproducing apparatus.
Figure 7:
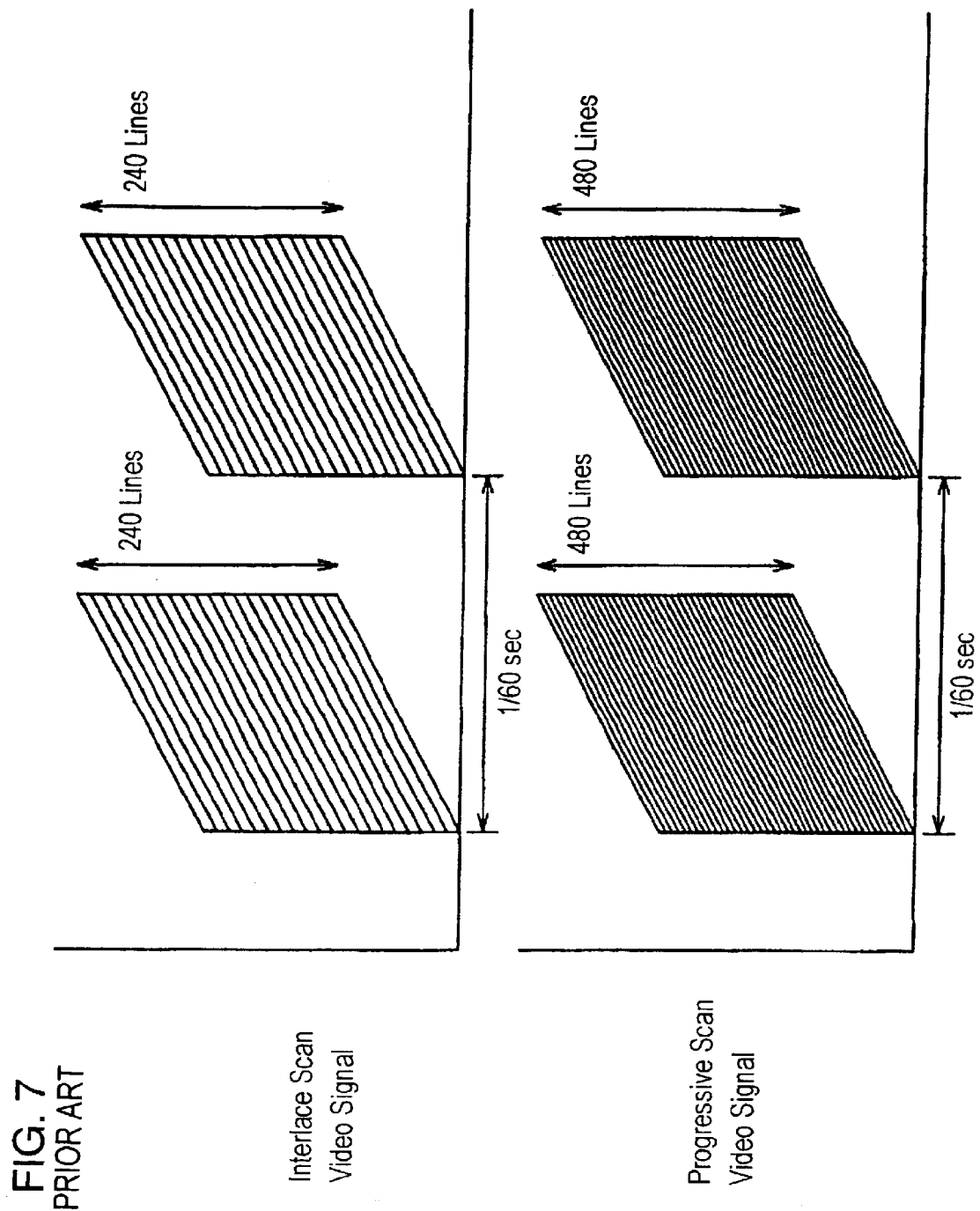
FIG. 7 is a schematic diagram showing compositions of an interlace-scan video signal and progressive-scan video signal.
Figure 8:
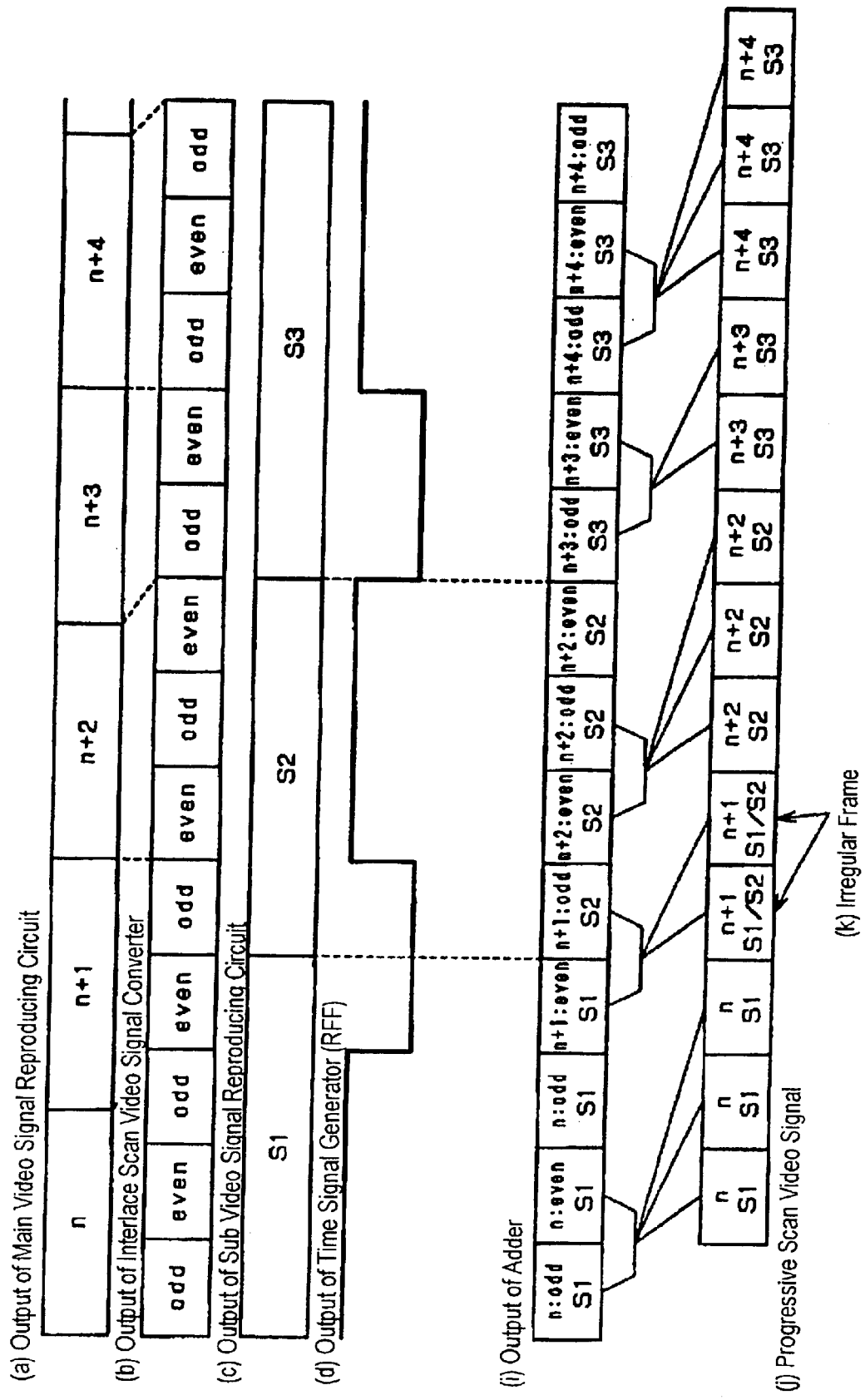
FIG. 8 is a time chart showing the operation of the conventional video signal reproducing apparatus.
Figure 9:
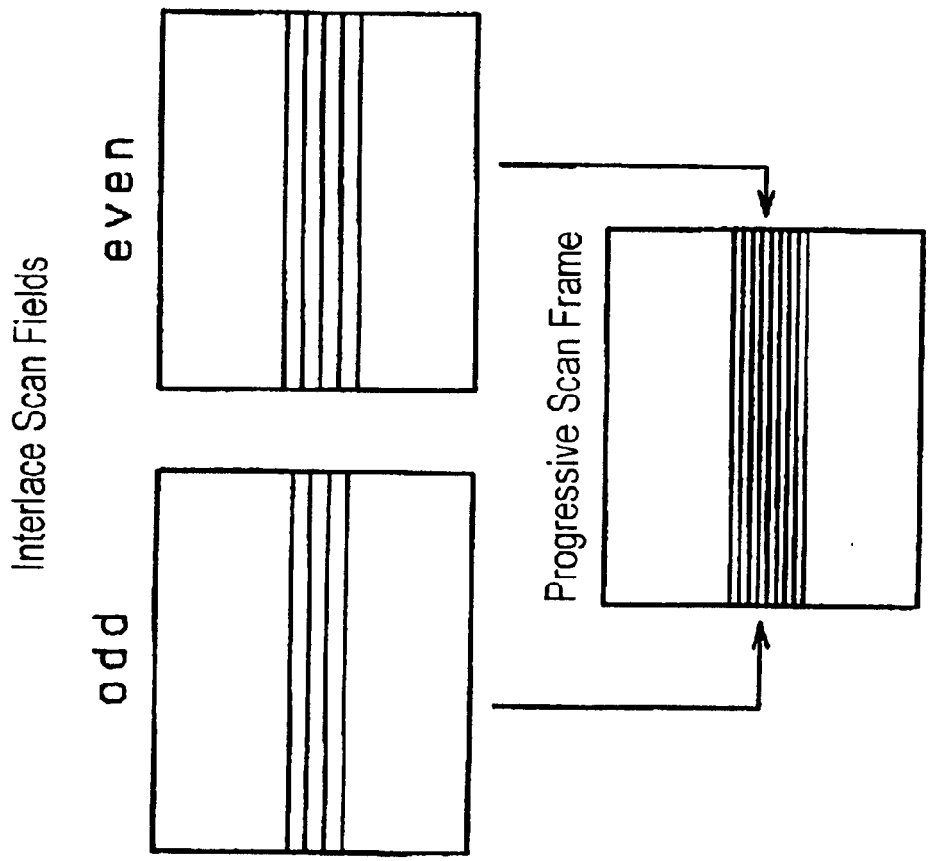
FIG. 9 is a schematic diagram showing the operation of progressive-scan video signal converter in the conventional video signal reproducing apparatus.

FIG. 5 is a schematic diagram of images of the video signals output by the video signal reproducing apparatus according to embodiment 1 of the invention.

For example in FIG. 3, the numeral "1" is displayed in a certain area of the sub-video S1, while no character is displayed in the certain area of the sub-video S2. The time-adjusting circuit 11 synchronizes the changing of the sub-videos S1 and S2 with the coupling of fields at the progressive-scan-video converter. In this reproducing apparatus, sub-videos S1, S2 are not displayed in combination alternatively in every line, but all sub-videos change over at once as shown in FIG. 5. Therefore, the numeral "1" is not displayed by half in every other line. As mentioned above, since the sub-video changes in a longer interval than the main video changes. And therefore, It is no problem in actual use that the changing of the sub-video delays by one field by the time-adjusting circuit 11.

In the video signal reproducing apparatus according to embodiment 1 of the invention, the main video signal is generated from a movie containing 24 frames per second. The interlace-scan converter issues the main video signal as interlace-scan video signal of 2 fields and 3 fields in every frame of the movie. But the technology of the invention is not limited to this. For example, in the case that the main video signal is a progressive-scan video signal of 30 frames per second, the interlace-scan converter issues each frame of the main video signal as interlace-scan video signal of 2 fields. Then similarly, the progressive-scan video signal is issued so that a single field of the sub-video may not leave or be visible even upon the changing of the sub-video, and the same effects are obtainable.

Also in the video signal reproducing apparatus according to embodiment 1 of the invention, the sub-video is the subtitle information recorded in the disk 1. But it may be any other video information changing asynchronously with the main video. For example, the sub-video may be the video information for telling the operation condition or the state of the reproducing apparatus to the user or for setting the condition.

In embodiment 1 of the invention, the output of the progressive-scan video of the reproducing apparatus contains an analog chrominance signal, but a digital signal or a primary color signal may be also contained.

In FIG. 1, this reproducing apparatus is expressed by 5 circuit blocks, but main constituent elements after reference numeral 4 may be realized by a software to replace them in a microprocessor or the like.

Further, the video signal reproducing apparatus comprises a disk apparatus. The invention may be also realized in other video signal reproducing apparatus, for example, a video cassette tape apparatus or broadcast receiver.

What is claimed is:

1. A video signal reproducing apparatus for reproducing a video signal including a main video signal of progressive-scan video, and a sub-video signal changing asynchronously with the main video signal, comprising:

an interlace-scan-video converter converting the main video signal into an interlace-scan video signal;

a sub-video adder for adding the sub-video signal to an output of said interlace-scan converter in synchronism with a boundary of frames of the main video signal in the output of said interlace-scan-video converter; and a progressive-scan video converter converting the output of said sub-video adder into a progressive-scan video signal in synchronism with the boundary of frames of the main video signal.

2. The video signal reproducing apparatus of claim 1, wherein the main video signal is a signal composed of 24 frames per second, and wherein said interlace-scan converter issues the main video signal as an interlace-scan video signal of 2 fields and 3 fields per the frame.

3. The video signal reproducing apparatus of claim 1, wherein the main video signal is a progressive-scan video signal composed of 30 frames per second, and wherein said interlace-scan converter issues each frame of the main video signal as an interlace-scan video signal of 2 fields.

4. The video signal reproducing apparatus of claim 1, wherein the sub-video signal is subtitle information of the main video signal.

5. The video signal reproducing apparatus of claim 1, wherein the sub-video signal is information showing a state of an operation of the video signal reproducing apparatus.

* * * * *